(12) United States Patent
Kodama et al.

(10) Patent No.: US 11,694,824 B2
(45) Date of Patent: Jul. 4, 2023

(54) MGB2 SUPERCONDUCTING WIRE MATERIAL AND MANUFACTURING METHOD THEREFOR

(71) Applicant: Hitachi, Ltd., Tokyo (JP)

(72) Inventors: Motomune Kodama, Tokyo (JP); Hideki Tanaka, Tokyo (JP); Takaaki Suzuki, Tokyo (JP); Hiroshi Kotaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 510 days.

(21) Appl. No.: 16/754,921

(22) PCT Filed: Nov. 2, 2018

(86) PCT No.: PCT/JP2018/040839
§ 371 (c)(1),
(2) Date: Apr. 9, 2020

(87) PCT Pub. No.: WO2019/150678
PCT Pub. Date: Aug. 8, 2019

(65) Prior Publication Data
US 2020/0294693 A1    Sep. 17, 2020

(30) Foreign Application Priority Data

Jan. 31, 2018    (JP) .................................. 2018-015323

(51) Int. Cl.
*H01B 12/00*          (2006.01)
(52) U.S. Cl.
CPC ..................................... *H01B 12/00* (2013.01)
(58) Field of Classification Search
CPC combination set(s) only.
See application file for complete search history.

(56) References Cited

U.S. PATENT DOCUMENTS 10,134,508 B2    11/2018   Ichiki et al.
2002/0164418 A1  11/2002   Fischer et al.
(Continued)

FOREIGN PATENT DOCUMENTS

EP    1 526 586 A2    4/2005
JP    4259806 B2      4/2000
(Continued)

OTHER PUBLICATIONS

JP 2005-310600 A English Translation ; published on Nov. 4, 2005 (Year: 2005).*

(Continued)

*Primary Examiner* — Pete T Lee
(74) *Attorney, Agent, or Firm* — Baker Botts L.L.P.

(57) ABSTRACT

The purpose of the present invention is to provide a method for causing sufficient deformation in precursor particles even when a soft high-purity metal is used for an outer layer material in mechanical milling, and manufacturing an $MgB_2$ superconducting wire. A method for manufacturing an $MgB_2$ superconducting wire in which an $MgB_2$ filament is covered by an outer layer material, the method comprising: subjecting magnesium powder and boron powder to a shock that is insufficient for $MgB_2$ to be clearly produced, and producing precursor particles in which boron particles are dispersed inside a magnesium matrix; filling a metal tub with the precursor particles; processing the metal tube filled with precursor particles to form a wire; and heat-treating the wire to synthesize the $MgB_2$; wherein the method is characterized in that a portion of the wire-drawing step includes swaging.

7 Claims, 6 Drawing Sheets

(56) References Cited

U.S. PATENT DOCUMENTS

| | | | |
|---|---|---|---|
| 2008/0017279 A1 | 1/2008 | Venkataramani et al. | |
| 2008/0236869 A1 | 10/2008 | Marte et al. | |
| 2019/0035519 A1 | 1/2019 | Kodama et al. | |

FOREIGN PATENT DOCUMENTS

| | | |
|---|---|---|
| JP | 2001-118437 A | 4/2001 |
| JP | 2005-310600 A | 11/2005 |
| JP | 2008-258158 A | 10/2008 |
| WO | WO 2015/087387 A1 | 6/2015 |
| WO | WO 2017/130672 A1 | 8/2017 |
| WO | WO 2017/179349 A1 | 10/2017 |

OTHER PUBLICATIONS

JP 2001118437A English Translation (Year: 2001).*
Notice of Reasons for Refusal, dated Aug. 17, 2021, for Japanese Application No. 2018-015323 (with English translation).
International Search Report, dated Jan. 8, 2019, which issued during the prosecution of International Application No. PCT/JP2018/040839, which corresponds to the present application.
M. Kodama et al., High-performance dense $MgB_2$ superconducting wire fabricated from mechanically milled powder, Superconductor Science and Technology, 30 (2017) 044006 (7pp).
W. Häßler et al., Influence of the milling energy transferred to the precursor powder on the microstructure and the superconducting properties of $MgB_2$ wires, Superconductor Science and Technology, 26 (2013) 025005 (7pp).
Extended European Search Report, dated Apr. 28, 2021, for European Application No. 18903617.1.

* cited by examiner (a)

(b)

| | LOW MAGNIFICATION | HIGH MAGNIFICATION |
|---|---|---|
| Ex situ |  |  |
| In situ |  |  |
| MM-CuFe |  |  |
| MM-CuFe-S |  |  |

MGB2 SUPERCONDUCTING WIRE MATERIAL AND MANUFACTURING METHOD THEREFOR

TECHNICAL FIELD

The present invention relates to an $MgB_2$ superconducting wire material and a manufacturing method therefor.

BACKGROUND ART

An advantage of a superconducting wire material is that a current can flow therethrough with zero resistance. An upper limit of a current density that can flow at the zero resistance is called a critical current density $J_c$, and is given as a function of temperature and magnetic field. The $J_c$ of a superconductor is determined by a flux pinning phenomenon. In a second-type superconductor, a magnetic flux is quantized and penetrates into a sample, and a magnetic flux line receives a Lorentz force during energization, and the magnetic flux line tends to move. When the magnetic flux line actually moves, a resistance loss occurs, and therefore, in a practical superconductor, a defect or an inhomogeneity for pinning the magnetic flux line is introduced into the sample.

Magnesium diboride (hereinafter, $MgB_2$) has a critical temperature ($T_c$ is about 40K) higher than that of a niobium-based superconductor (niobium titanium, niobium tritin) that is widely used at present. Since the $MgB_2$ can be made into a wire material at a low cost, it is expected as a next-generation superconducting material. It has been pointed out that in the $MgB_2$ a crystal grain boundary acts as a magnetic flux pinning center. It is important to maintain a low crystallinity and a fine crystal grain in order to increase a magnetic flux pinning force by the crystal grain boundary, and in order to realize such a fine structure, it is considered effective to synthesize the $MgB_2$ at a low temperature of 700° C. or lower.

The $MgB_2$ wire material is generally manufactured by a Powder in Tube (PIT) method in which powder is packed in a metal tube to form a wire material. This method is further classified into an ex situ method and an in situ method. In the ex situ method, the metal tube is filled with $MgB_2$ powder and a wire material is formed, followed by a heat treatment to sinter the $MgB_2$ powder. In the in situ method, the $MgB_2$ is synthesized by filling the metal tube with mixed powder of magnesium and boron, forming the wire material, and then performing the heat treatment.

In the ex situ method, a relatively high sintering temperature (800 to 900° C.) is required to satisfactorily bond $MgB_2$ particles to each other, and there is a problem that the magnetic flux pinning force is weakened. On the other hand, the in situ method is advantageous from a viewpoint of magnetic flux pinning since the $MgB_2$ is generated even at a low-temperature heat treatment of 700° C. or lower. However, since a reaction of generating the $MgB_2$ from the magnesium and the boron involves a volume reduction, a large number of voids are generated and a sufficient superconducting current path cannot be obtained. In this way, the ex situ method and the in situ method, which are typical methods for manufacturing the $MgB_2$ wire material, are not necessarily the best methods.

A mechanical milling method is one of effective means for solving such a problem in the manufacturing method in the related art (NPL 1). In the mechanical milling method, a pot is filled with magnesium powder and boron powder together with a ball, and is revolved at a high speed by a planetary mill device to collide the powder with the ball or an inner wall of the pot. By this process, precursor particles in which boron particles are dispersed in a magnesium matrix are synthesized. However, there is a problem that since the precursor particles are hard, the precursor particles do not deform sufficiently in a metal sheath when being made into the wire material, and a sufficient adhesion between the particles does not occur. When the adhesion between the particles is insufficient, even when the precursor particles are changed to the $MgB_2$ by the heat treatment, a superconducting current path excellent in continuity is not formed. In order to cope with such a problem, it is effective to introduce a processing method in which a part of a processing jig in direct contact with the wire material is not fixed but rotates (for example, cassette roller drawing) or a warm processing into a part of a wire forming step (PTL 1). In addition, it is also effective to add a solid organic substance to the magnesium powder and the boron powder during synthesizing the precursor particles (PTL 2).

On the other hand, in NPL 2 and PTL 3, the $MgB_2$ is partially alloyed by a planetary mill mixing of the magnesium powder and the boron powder with higher energy (mechanical alloying). It is reported that a high $J_c$ can be obtained by using such filling powder.

CITATION LIST

Patent Literature

PTL 1: WO 2017/130672
PTL 2: WO 2017/179349
PTL 3: Japanese Patent No. 4259806

Nonpatent Literature

NPL 1: Supercond. Sci. Technol. 30 (2017) 044006
NPL 2: Supercond. Sci. Technol. 26 (2013) 025005

SUMMARY OF INVENTION

Technical Problem

Generally, the superconducting wire material is compounded with a high-purity metal such as copper or aluminum. The high-purity metal has a low resistivity and a high thermal conductivity. Therefore, a sufficient amount of high-purity metal reduces a resistivity of the wire material, effectively diffuses heat, and also serves as a heat bath when quenching occurs and a transition to normal conduction occurs. Therefore, burnout of the wire material due to an excessive rise in temperature is prevented.

On the other hand, the high-purity metal that is compounded to improve a thermal stability thereof is generally soft. According to a subsequent study by the present inventors, it is found that when a soft material (Vickers hardness (test force: 25 gf) after performing the heat treatment for generating the $MgB_2$ is less than 150 HV) is used for a sheath material (outer layer material), particularly when the soft material is arranged on an outer side of an $MgB_2$ filament, a deformation of the precursor particles is not sufficient and the critical current density is lowered even when the techniques of PTLs 1 and 2 are used. Therefore, in the mechanical milling method, it is very difficult to compound with the high-purity metal to improve the thermal stability, or a significant restriction occurs in a compounding method.

An object of the invention is to provide a method for manufacturing an $MgB_2$ superconducting wire material having a sufficient deformation in precursor particles and excellent in both thermal stability and critical current characteristics, even when a soft high-purity metal is used for an outer layer material, in a mechanical milling method.

Another object of the invention is to provide an $MgB_2$ superconducting wire material having an excellent thermal stability and a high critical current density.

Solution to Problem

In order to solve the problems, the invention provides a method for manufacturing an $MgB_2$ superconducting wire material in which an $MgB_2$ filament is covered with an outer layer material, the method including: a precursor particle synthesizing step of applying an impact to magnesium powder and boron powder to an extent that $MgB_2$ is not clearly generated to generate precursor particles in which boron particles are dispersed inside a magnesium matrix; a filling step of filling a metal tube with the precursor particles; a wire forming step of processing the metal tube filled with the precursor particles into a wire material; and a heat treatment step of heat-treating the wire material to synthesize $MgB_2$, in which a swaging is included as a part of the wire forming step.

In addition, the invention provides an $MgB_2$ superconducting wire material in which an $MgB_2$ filament is covered with an outer layer material, in which in an $MgB_2$ filament portion of a longitudinal section of the $MgB_2$ superconducting wire material, a perimeter density of a void having a perimeter greater than 50 μm is less than 10 $mm^{-1}$, and a median diameter of a number-based distribution of a circle equivalent diameter of the void is less than 100 nm.

The description includes the disclosure content of Japanese Patent Application No. 2018-015323, which is the basis for the priority of the application.

Advantageous Effect

According to the invention, a sufficient deformation and a mutual adhesion of the precursor particles occur, an $MgB_2$ filament excellent in continuity is formed by a subsequent heat treatment step, and the high critical current density can be obtained. This effect is particularly noticeable when a high-purity metal such as copper is used as the outer layer material of the wire material. Therefore, a wire material having a high thermal stability can be manufactured. In a superconducting device manufactured from such a wire material, it is possible to energize stably at a high current density, so that a length of the wire material can be shortened and a compact design can be achieved. Problems, configurations, and effects other than those described above are apparent from the following description of the embodiments.

DESCRIPTION OF EMBODIMENTS

Figure 1:
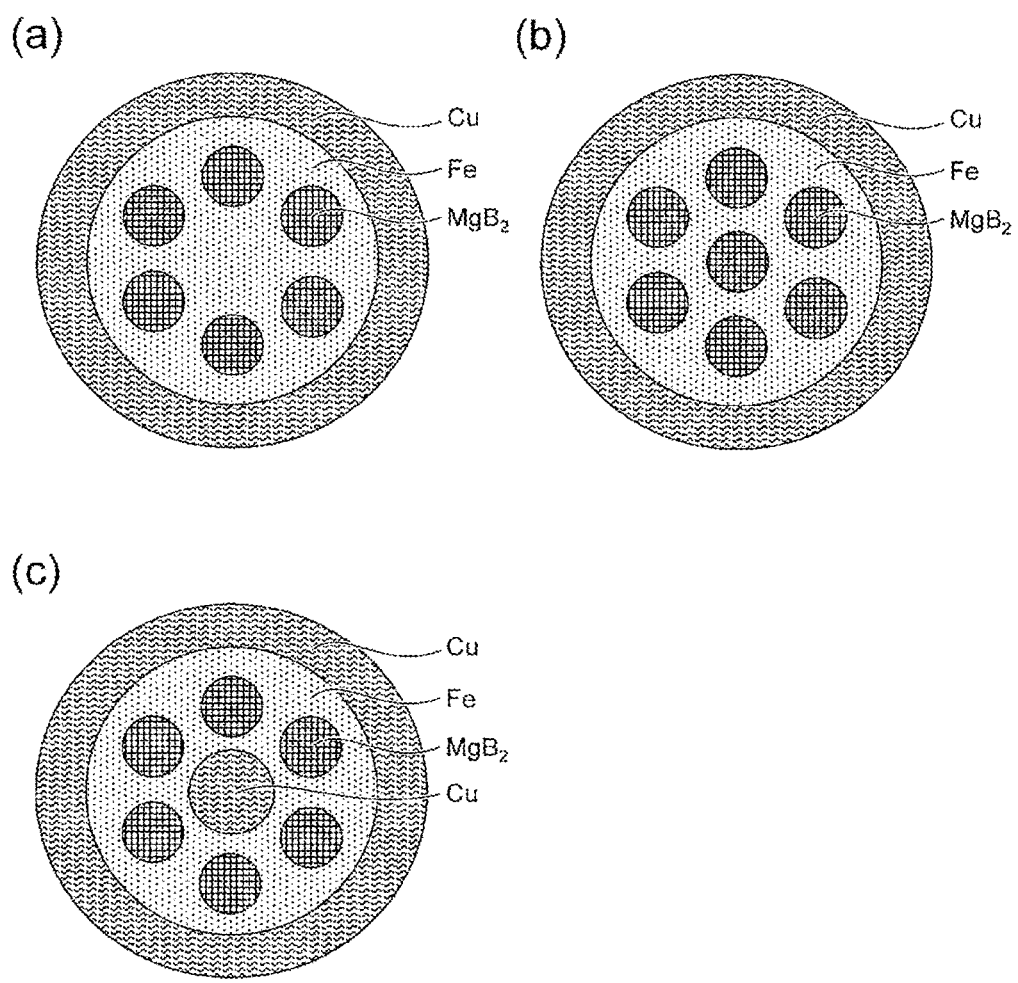
FIG. 1 shows diagrams showing an example of a cross-sectional configuration of a multi-core wire material.

Hereinafter, the invention will be described in detail with reference to embodiments.

A method for manufacturing an $MgB_2$ superconducting wire material according to the embodiment includes: a precursor particle synthesizing step of applying an impact to magnesium powder and boron powder to an extent that $MgB_2$ is not clearly generated to generate precursor particles in which boron particles are dispersed inside a magnesium matrix; a filling step of filling a metal tube with the obtained precursor particles; a wire forming step of processing the metal tube filled with the precursor particles into a wire material; and a heat treatment step of heat-treating the obtained wire material to synthesize the $MgB_2$. Accordingly, an $MgB_2$ superconducting wire material in which an $MgB_2$ filament is covered with an outer layer material derived from the metal tube is obtained.

In the precursor particle synthesizing step, first, the magnesium powder and the boron powder are weighed to have a predetermined ratio. Then, an impact is applied when mixing the weighed powder to synthesize the precursor particles having a structure in which the boron particles are dispersed in the magnesium matrix. At this time, the impact is applied to an extent that the $MgB_2$ is not clearly generated in the precursor particles. Here, "the $MgB_2$ is not clearly generated" means that a peak of the $MgB_2$ is not confirmed in a powder X-ray diffraction of the precursor particles. Various means can be used as means for synthesizing such precursor particles, and a preferred example is a planetary mill. In the planetary mill, a pot is filled with a ball, the magnesium powder, and the boron powder, and the pot is revolved at a high speed. At this time, the powder receives the impact from the ball or an inner wall of the pot, and the precursor particles having the structure in which the boron particles are dispersed inside the magnesium matrix are synthesized.

As raw materials of the precursor particles, in addition to the magnesium powder and the boron powder, if necessary, impurities can be added. Examples of the impurities include carbon-containing materials such as SiC, $B_4C$, hydrocarbons, fatty acids and metal salts thereof. By these impurities, a B site is replaced by carbon, and a critical current density $J_c$ can be improved. When the impurities are added, an adding amount thereof is preferably such that an amount of C atoms is in a range of 0.5 to 7.5 atomic % with respect to B atoms in the raw materials of the precursor particles. Further, when an organic substance in a solid state at room temperature, such as a polycyclic aromatic hydrocarbon (such as coronene), a fatty acid (such as stearic acid), or a metal salt of the fatty acid (such as magnesium stearate) is added, in addition to an effect of carbon substitution, an effect of improving a deformability of the precursor particles is also added, and particles constituting a filament are firmly bonded.

A material of the metal tube filled with the precursor particles is not particularly limited, but as a material of a portion in contact with the MgB$_2$ filament, it is necessary to avoid a material that excessively reacts during the heat treatment for generating the MgB$_2$. Examples of such a material include iron, niobium, tantalum, titanium or the like.

Further, if necessary, the powder can be filled in a multi-tube in which a plurality of metal tubes are compounded. Accordingly, the MgB$_2$ superconducting wire material in which the MgB$_2$ filament is covered with the outer layer material containing a plurality of materials is obtained. As the plurality of materials, other materials are not particularly limited as long as the material of the portion in contact with the MgB$_2$ filament is iron, niobium, tantalum, titanium, or the like as described above. Preferably, at least one of the plurality of materials is a metal material having a high thermal conductivity such as copper, aluminum, silver, which is generally soft and has a Vickers hardness of less than 150 HV (test force: 25 gf). Here, the Vickers hardness is a maximum value measured at various stages from a processing of the wire material to a final heat treatment. These materials are generally used to ensure a thermal stability of the superconducting wire material. As an example, there is a double tube in which an iron tube is inserted inside a copper tube. According to the manufacturing method of the embodiment, even when copper, aluminum, silver or the material having a Vickers hardness of less than 150 HV (test force: 25 gf) is used on an outer side of the outer layer material, an excellent adhesion between the precursor particles and a high critical current density are obtained.

In the wire forming step, the metal tube filled with the precursor particles is processed into the wire material. Examples of processing means include drawing processing, cassette roller drawing, groove roll processing, or the like, and these processing methods can be appropriately combined and used. The cassette roller drawing or the groove roll processing is a processing in which a compressive force in a radial direction of the wire material is stronger than that in the drawing processing, and has an effect of promoting the deformation of the precursor particles to adhere the precursor particles.

The manufacturing method according to the embodiment is characterized in that the swaging is included as a part of the wire forming step. The swaging is a forging processing in which a die is rotated and an outer diameter of the wire material is reduced while hitting the wire material in the radial direction. Only in the above drawing processing or cassette roller drawing, particularly when a soft material such as copper is contained on the outer side the outer layer material, the precursor particles cannot be adhered. Since the swaging is a processing in which a surface of the wire material is hit more directly, the compressive force in the radial direction is greater than that in the cassette roller drawing. Therefore, even though a soft outer layer material, it is possible to deal with the soft material and to thus achieve the deformation and the adhesion of the precursor particles.

The swaging can be performed at any stage as long as the swaging is a part of the wire forming step, and in particular, the swaging is preferably performed at a stage close to a final wire diameter of the wire material. Even when the precursor particles are adhered by performing the swaging in an early stage of the wire forming step, the precursor particles may be separated from each other again when forming the wire material by another processing method thereafter. When the swaging is performed from an excessively large diameter, a cross section of the wire material may be disturbed or the filament may be broken due to a force received from a rotating die. Therefore, preferably, when the final wire diameter of the MgB$_2$ superconducting wire material is d, the swaging is preferably performed within a range of 2d or less. When the swaging is performed to obtain the final wire diameter, a dent of a die peculiar to the swaging may remain on the surface of the wire material. In this case, the drawing processing may be performed again to eliminate the dent.

The MgB$_2$ is synthesized by heat-treating the wire material obtained through the wire forming step, and the MgB$_2$ superconducting wire material in which the MgB$_2$ filament is covered with the outer layer material can be manufactured. The heat treatment can be performed, for example, at a temperature of 600 to 700° C.

The MgB$_2$ superconducting wire material may have a single-core structure including one MgB$_2$ filament or a multi-core structure including a plurality of MgB$_2$ filaments. For example, a single-core wire material can be obtained by filling the metal tube with the precursor particles and forming the wire material, or a multi-core wire material can be obtained by manufacturing a plurality of single-core wire materials having a relatively large diameter, reassembling the single-core wire materials into the metal tube again, and forming the wire material. In either case, by including the swaging in the part of the wire forming step, the precursor particles are adhered with each other, and excellent critical current characteristics can be obtained.

FIG. 1 shows an example of a cross-sectional configuration of the multi-core wire material. In (a), copper is arranged in an outermost layer, and six MgB$_2$ filaments are embedded in an iron matrix. As described above, as the material of the portion in contact with the MgB$_2$ filament, it is preferable to avoid the material that excessively reacts during the heat treatment for generating the MgB$_2$. In (b), copper is arranged in the outermost layer, and seven MgB$_2$ filaments are embedded in the iron matrix. By arranging the MgB$_2$ filament also at a center, it is possible to increase a cross-sectional area of the MgB$_2$. In (c), copper is arranged in the outermost layer and the center, and six MgB$_2$ filaments are embedded in the iron matrix. By arranging copper also at the center, it is possible to improve the thermal stability. In this way, by performing the swaging, when a high $J_c$ can be obtained even when soft copper is arranged at the outer side, a degree of freedom of the cross-sectional configuration is significantly increased. Although copper is assumed as a stabilizing material in the cross-sectional configuration of FIG. 1, the material having a Vickers hardness of less than 150 HV (test force: 25 gf) such as aluminum or silver may be used.

The MgB$_2$ superconducting wire material manufactured by the manufacturing method according to the embodiment has the high critical current density, and has a characteristic microscopic structure that is difficult to achieve with other typical manufacturing methods such as an in situ method and an ex situ method. As quantities characterizing this microscopic structure, two quantities in a secondary electron image of a longitudinal section of the wire material obtained by a scanning electron microscope are defined as follows.

Perimeter Density of Coarse Void

The "coarse void" is defined as a void having a perimeter greater than 50 μm. The "perimeter density of the coarse void" is a total perimeter of the coarse void per unit area. In the MgB$_2$ superconducting wire material according to the embodiment, the perimeter density of the coarse void is less than 10 mm$^{-1}$, and preferably less than 1 mm$^{-1}$. The perimeter density of the coarse void can be calculated with a good reproducibility by using an image with a magnification of, for example, about 1,000 folds.

Median Diameter of Void

The "median diameter of the void" is defined as the median diameter of a number-based distribution of a circle equivalent diameter of the void. The median diameter of the void can be calculated with a good reproducibility by using an image with a magnification of, for example, about 10,000 folds. However, a minute void having a circle equivalent diameter of 30 nm or less is difficult to observe, and therefore is ignored in calculating the median diameter of the void. It is also difficult to observe a void having a circle equivalent diameter of more than 10 μm, which is too large, but since such a void has an overwhelmingly small number density, an influence of the void on the median diameter is extremely small, and similarly, the void can be ignored. In the $MgB_2$ superconducting wire material according to the embodiment, the median diameter of the void is less than 100 mm, and preferably less than 50 mm.

The $MgB_2$ superconducting wire material of the embodiment, in which the perimeter density of the coarse void is less than 10 $mm^{-1}$ and the median diameter of the void is less than 100 nm, has the particles adhered with each other and can show a high critical current density $J_c$.

Examples

Hereinafter, the invention will be described in more detail with reference to Examples and Comparative Examples, but the invention is not limited to these Examples.

As starting materials, Mg powder (particle size −200 mesh, purity>99.8%), B powder (particle size<250 nm, purity>98.5%, amorphous), and coronene ($C_{24}H_{12}$) powder (purity>83%) were used.

Figure 2:
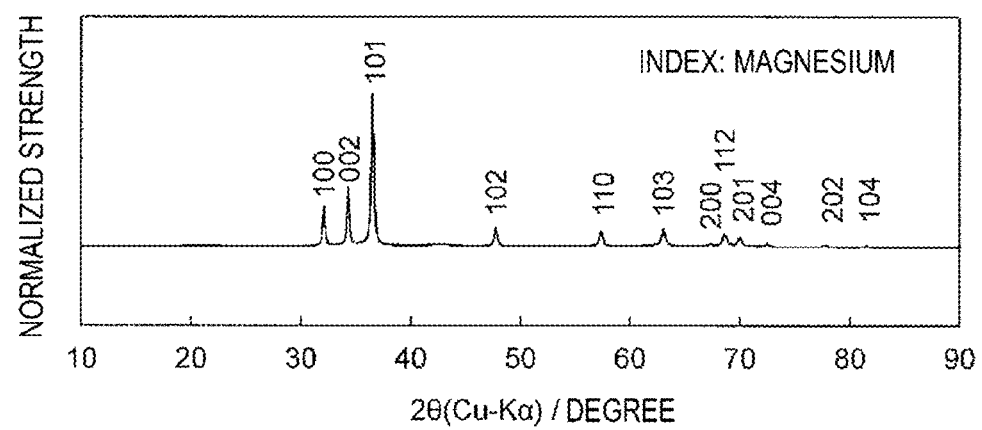
FIG. 2 is a diagram showing an X-ray diffraction spectrum of a precursor particle.

The powder was weighed such that an atomic composition ratio is Mg:B:C=1:1.96:0.04. The weighed powder was enclosed in a zirconia container together with a zirconia ball, and mixed by a planetary mill device under conditions of 400 rpm for 6 hours. FIG. 2 shows an X-ray diffraction spectrum of the mixed precursor particles. All peaks were identified as being derived from magnesium, indicating that no $MgB_2$ was generated during this mixing process. That is, a partial generation of the $MgB_2$ as in Non-PTL 2 and PTL 3 does not occur. The metal tube was filled with the precursor particles, and three wire materials MM-Fe, MM-CuFe and MM-CuFe—S were manufactured by wire forming processing. Table 1 shows conditions for manufacturing the wire material. For the MM-Fe, an iron tube having an outer diameter of 18.0 mm and an inner diameter of 13.5 mm was used, and the wire material was formed in an order of drawing processing to a wire diameter of 0.8 mm and cassette roller drawing to a wire diameter of 0.5 mm. For metal tubes of the MM-CuFe and the MM-CuFe—S, a double tube of iron on the inner side and copper on the outer side was used. This double tube has an iron tube having an outer diameter of 17.0 mm and an inner diameter of 13.5 mm inserted on the inner side of a copper tube having an outer diameter of 20.0 mm and an inner diameter of 17.0 mm. For the MM-CuFe, the wire material was formed in the order of the drawing processing to a wire diameter of 1.5 mm, and the cassette roller drawing to a wire diameter of 0.7 mm. For the MM-CuFe—S, the wire material was formed in the order of the drawing processing to the wire diameter of 1.5 mm, the cassette roller drawing to a wire diameter of 1.0 mm, and the swaging to a wire diameter of 0.7 mm. Here, in the swaging, the diameter was reduced in three passes in the order of wire diameters of 0.9 mm, 0.8 mm, and 0.7 mm. Each wire material is cut out by a length of about 70 mm and subjected to a heat treatment at 600° C. for 3 hours in an argon atmosphere to generate $MgB_2$.

TABLE 1

| Wire material | Metal tube material Outer diameter/inner diameter (mm) | Processing | Final wire diameter (mm) |
|---|---|---|---|
| MM-Fe (Comparative Example) | Fe tube 18.0/13.5 | Drawing (to 0.8 mm) → cassette roller (to 0.5 mm) | 0.5 |
| MM-CuFe (Comparative Example) | CuFe double tube 20.0/13.5 | Drawing (to 1.5 mm) → cassette roller (to 0.7 mm) | 0.7 |
| Wire-CuFe—S (invention) | CuFe double tube 20.0/13.5 | Drawing (to 1.5 mm) → cassette roller (to 1.0 mm) → swaging (to 0.7 mm) | 0.7 |

The critical current density of the $MgB_2$ superconducting wire material after the heat treatment was measured. A predetermined magnetic field is applied to a sample by a superconducting magnet magnetic field, and the sample was maintained at a predetermined temperature using a helium gas flow rate and a heater. A dependency of the generated electric field of the sample on an energizing current was obtained by a DC four-terminal method, an energizing current value when an electric field of 1 μV was generated was defined as a critical current $I_c$, and a value obtained by dividing $I_c$ by an $MgB_2$ area of a cross section of the wire material was defined as a critical current density $J_c$.

Figure 3:
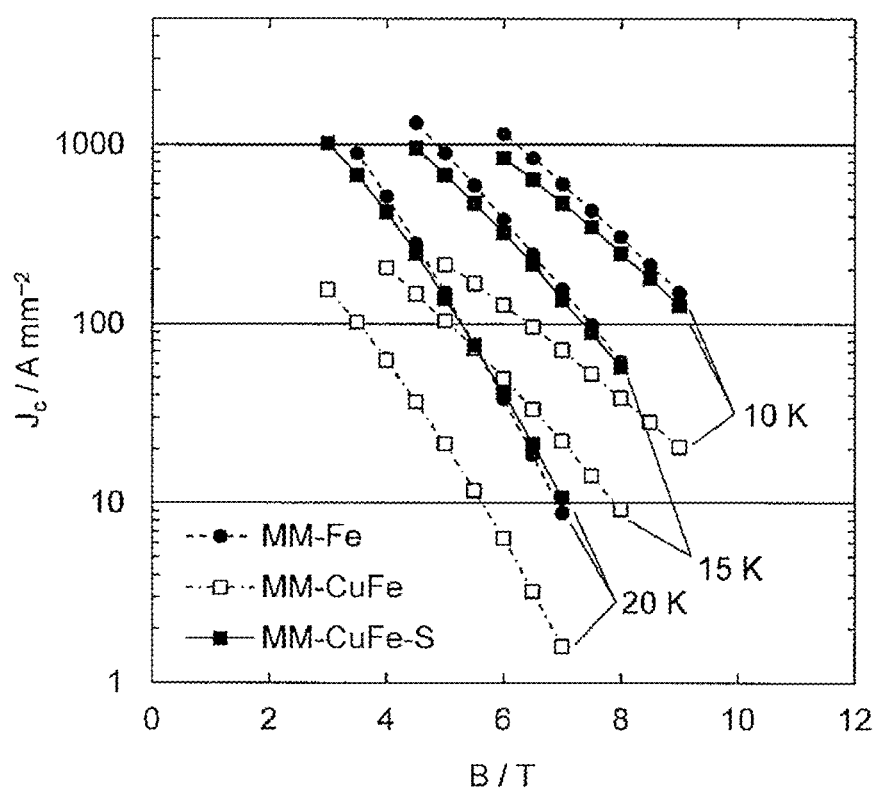
FIG. 3 is a graph showing a dependence of critical current densities $J_c$ of three types of single-core wire materials on an external magnetic field B.

FIG. 3 shows a dependence of critical current densities $J_c$ of three types of wires on an external magnetic field B. The $J_c$ of the MM-FeCu is about one digit lower than that of the MM-Fe. That is, when a processing technology in the related art is adopted, a high $J_c$ cannot be obtained when the outer layer material contains a soft material such as copper. On the other hand, in the MM-CuFe—S, the $J_c$ was obtained as high as in the MM-Fe. In this way, it is found that by performing the swaging, a high $J_c$ can be obtained even when the outer layer material contains a soft material such as copper.

In order to investigate a reason that $J_c$s of the MM-Fe and the MM-FeCu are significantly different, the wire materials before and after the heat treatment were filled with resins, longitudinal section samples were prepared by dry polishing and cross-section polisher (CP) processing, and microscopic structures thereof were observed by an electron microscope.

Figure 4:
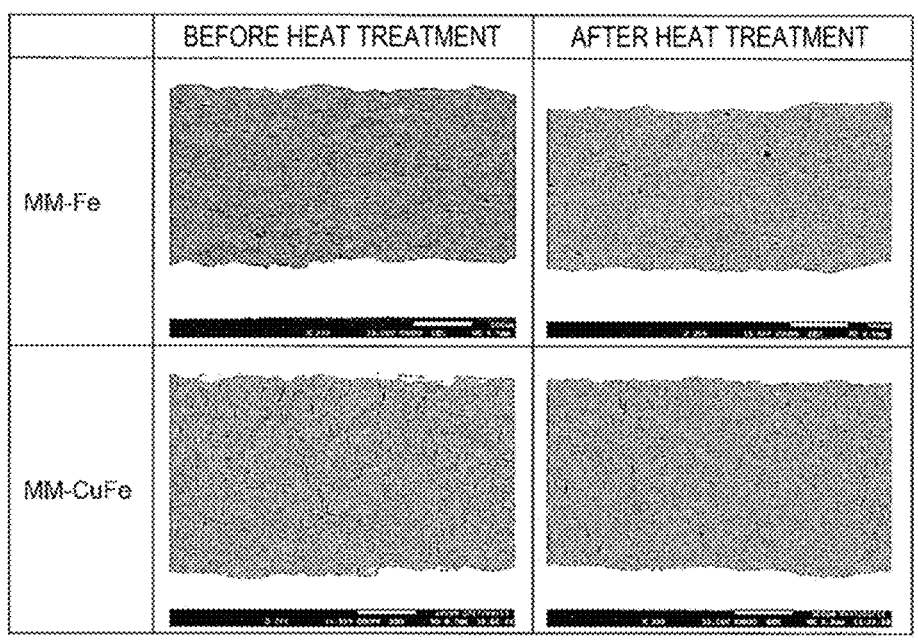
FIG. 4 shows electron microscope images of longitudinal sections of single-core wire materials having different outer layer materials.

FIG. 4 shows backscattered electron images in longitudinal sections of these samples. In the MM-Fe before the heat treatment, the precursor particles are sufficiently deformed and adhere to each other to form a dense structure. As a result, a good continuity is maintained even with the $MgB_2$ filament after the heat treatment. On the other hand, in the MM-CuFe before the heat treatment, an adhesion of an interface between the precursor particles is poor, and a boundary between the particles is clear. This boundary remains within the $MgB_2$ filament without disappearing even after the heat treatment. Therefore, a reason why the $J_c$ of the MM-CuFe is low is that the interface of the precursor particles is not adhered. The wire material was cut out at various wire diameters during the processing, and when the Vickers hardness was measured for the cross section, the Vickers hardness was 40 to 150 HV (test force: 25 gf) for copper and 150 to 400 HV (test force: 50 gf) for iron. In this way, since copper is softer than iron or the filament, even when the cassette roller drawing is performed, an efficiency of transmitting a force from the surface of the wire material to the inside is poor, and the interface between the precursor particles does not adhere.

Subsequently, in order to investigate a factor of obtaining the high $J_c$ in the MM-CuFe—S despite copper being contained in the outer layer material, after the wire materials before the heat treatment of the MM-CuFe and the MM-CuFe—S were filled with the resins, the longitudinal section samples were prepared by wet polishing, and the microscopic structures thereof were observed by the optical microscope.

Figure 5:
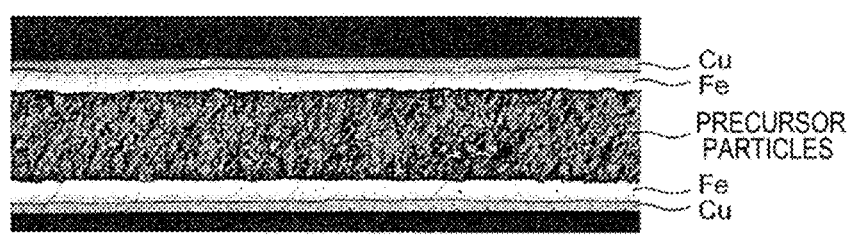
FIG. 5 shows electron microscope images of longitudinal sections of copper-iron-sheathed single-core wire materials obtained by using different processing methods ((a) MM-CuFe, (b) MM-CuFe—S).
Figure 5:
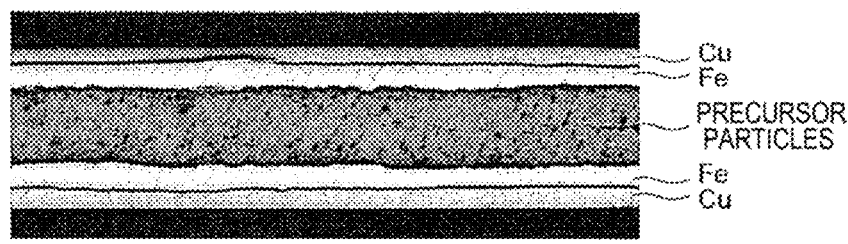

FIG. 5 shows optical microscope images of the longitudinal sections of these samples. It is found that the MM-CuFe (FIG. 5 (a)) is inferior in the adhesion between the particles compared with the MM-CuFe—S(FIG. 5 (b)). In this way, it is found that by performing the swaging, even when the outer layer material contains a soft material such as copper, the particles adhere to each other, so that the high $J_c$ of the MM-Fe or the like can be obtained.

Figure 6:
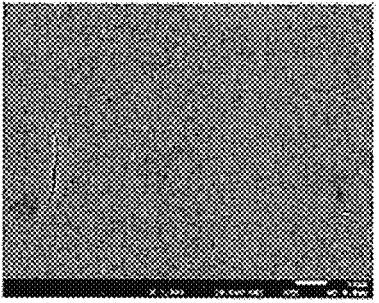
FIG. 6 shows electron microscope images of longitudinal sections of wire materials manufactured by various manufacturing methods.
Figure 6:
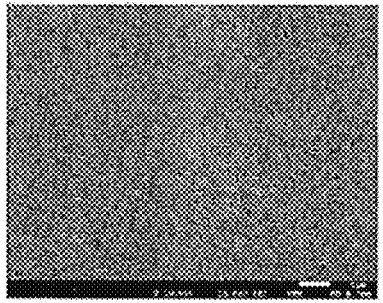
Figure 6:
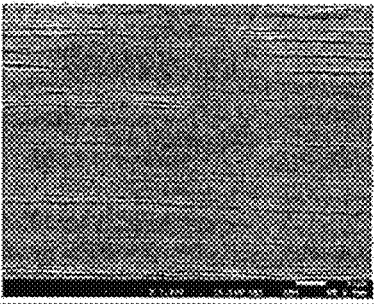
Figure 6:
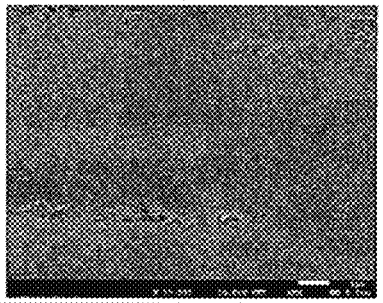
Figure 6:
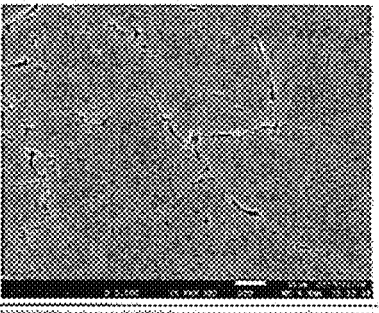
Figure 6:
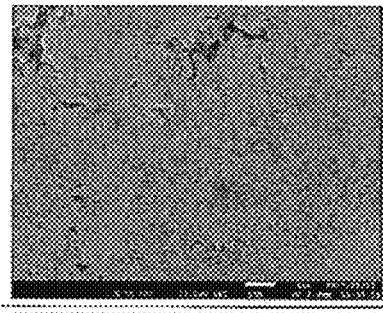
Figure 6:
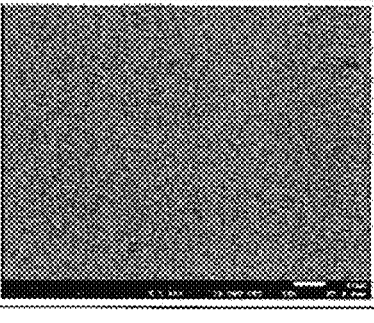
Figure 6:
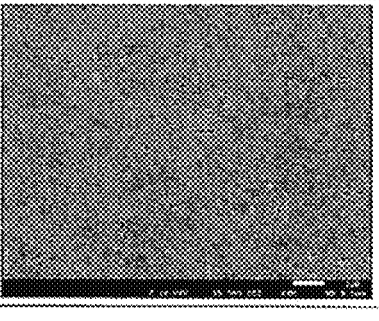

Next, in order to evaluate two quantities (the perimeter density of the coarse void, and the median diameter of the void) in the secondary electron image of the longitudinal section of the wire materials obtained by the scanning electron microscope, an ex-situ wire, an in-situ wire, the MM-CuFe and the MM-CuFe—S after the heat treatment were filled with resins, then the longitudinal section samples were prepared by the dry polishing and the cross-section polisher processing, and the microscopic structures thereof were observed by the electron microscope (JEOL: JSM-7001F). FIG. 6 shows secondary electron images of the longitudinal sections in the ex situ method, the in situ method, the MM-CuFe and the MM-CuFe—S. An acceleration voltage was set to 15 kV, and an observation was performed at two types of magnifications including 1,000 folds (a low magnification) and 10,000 folds (a high magnification). The perimeter density of the coarse void was estimated from a 1,000-fold image, and the median diameter of the void was estimated from a 10,000-fold image. As an analysis method, after the void of an image and another part were binarized by color coding, the perimeter of the void and the circle equivalent diameter were calculated using image software ImageJ. In order to improve the analysis accuracy, an analysis was performed using a plurality of images.

Circumferential Density of Coarse Void:

In the wire material obtained by the in situ method, a large number of voids extending in a longitudinal direction of the wire material are generated. As for the MM-CuFe, the precursor particles do not adhere to each other and cracks run in all directions. Therefore, in these wire materials, the perimeter density of the coarse void was extremely large, more than 100 $mm^{-1}$. The ex situ wire material and the MM-CuFe—S had extremely similar fine structures at the low magnification, almost no coarse void was found, and the perimeter density of the coarse void was less than 10 $mm^1$.

Median Diameter of Void:

The ex situ wire material and the MM-CuFe—S both had a large number of submicron-sized voids, but the ex situ wire material tended to have larger voids, and there was a difference in the median diameter of the voids. Based on the images of FIG. 6, the median diameter was calculated to be 180 nm for the ex situ wire material and 65 nm for the MM-CuFe—S. This difference is considered to be due to a difference in a generation and sintering process of the $MgB_2$. In the ex situ method of sintering $MgB_2$ powder, a gap between original $MgB_2$ particles remains as the void. In order to prepare the $MgB_2$ powder, generally, an $MgB_2$ bulk is synthesized and crushed. However, a particle diameter that can be reached by crushing is at most about 1 μm. On the other hand, in the MM-CuFe—S, the magnesium enters the boron particles to generate the $MgB_2$, and the gap between original boron particles remains as the void. The particle diameter of the boron powder used for a synthesis of the $MgB_2$ is generally finer than 1 μm. As a result, it is considered that the void is finer than in the ex situ method.

In Table 2, features of the microscopic structure of the wire material obtained by each of the manufacturing methods are summarized. It is extremely difficult to reduce both the perimeter density of the coarse void and the median diameter of the void by means other than using the mechanical milling method and sufficiently adhering the precursor particles by the swaging. In particular, when a soft material such as copper is contained in the outer layer material, the particles can be effectively adhered with each other by using the swaging, and the high critical current density can be obtained.

TABLE 2

|  | Perimeter density of coarse void | Median diameter of void |
| --- | --- | --- |
| Ex situ | <10 $mm^{-1}$ | >100 nm |
| In situ | >100 $mm^{-1}$ | — |
| MM-CuFe | >100 $mm^{-1}$ | — |
| MM-CuFe—S | <10 $mm^{-1}$ | <100 nm |

As described above, although the embodiment of the invention has been described in detail, specific configurations are not limited to the embodiment, and design changes and the like within the scope not departing from the spirit of the invention are also included in the invention.

All publications, patents, and patent applications cited in the description are hereby incorporated in the description by reference as they are.

The invention claimed is:

1. A method for manufacturing an $MgB_2$ superconducting wire material in which an $MgB_2$ filament is covered with an outer layer material, the method comprising:
   a precursor particle synthesizing step of applying an impact to magnesium powder and boron powder to an extent that $MgB_2$ is not clearly generated to generate precursor particles in which boron particles are dispersed inside a magnesium matrix;
   a filling step of filling a metal tube with the precursor particles;
   a wire forming step of processing the metal tube filled with the precursor particles into a wire material; and
   a heat treatment step of heat-treating the wire material to synthesize $MgB_2$, wherein
   a swaging is included as a part of the wire forming step;
   wherein the outer layer material contains a plurality of materials;
   wherein at least one of the plurality of materials is copper, aluminum, silver, or a material having a Vickers hardness of less than 150 HV (test force: 25 gf).

2. The method for manufacturing an $MgB_2$ superconducting wire material according to claim 1, wherein when a final wire diameter of the $MgB_2$ superconducting wire material is d, the swaging is performed within a range of 2d or less of a wire diameter.

3. The method for manufacturing an $MgB_2$ superconducting wire material according to claim 1, wherein the $MgB_2$ superconducting wire material includes a plurality of the $MgB_2$ filaments.

4. An $MgB_2$ superconducting wire material in which an $MgB_2$ filament is covered with an outer layer material, wherein in an $MgB_2$ filament portion of a longitudinal section of the $MgB_2$ superconducting wire material, a total perimeter of a course void having a perimeter greater than 50 µm per unit area is less than 10 $mm^{-1}$, and a median diameter of a number-based distribution of a circle equivalent diameter of the void is less than 100 nm;
  wherein the outer layer material contains a plurality of materials;
  wherein at least one of the plurality of materials is copper, aluminum, silver, or a material having a Vickers hardness of less than 150 HV (test force: 25 gf).

5. The $MgB_2$ superconducting wire material according to claim 4, comprising a plurality of the $MgB_2$ filaments.

6. The method of claim 1, wherein copper is arranged in an outermost layer.

7. The method of claim 4, wherein copper is arranged in an outermost layer.

* * * * *